(12) United States Patent
Lethen et al.

(10) Patent No.: US 6,375,003 B1
(45) Date of Patent: Apr. 23, 2002

(54) HOLDING DEVICE FOR AT LEAST ONE COMPACT DISC

(76) Inventors: Philip Lethen, Corneliusstr. 37, D-47798 Krefeld (DE); Markus Maria Jansen, Lutherplatz 24, D-47805 Krefeld (DE)

( * ) Notice: Subject to any disclaimer, the term of this patent is extended or adjusted under 35 U.S.C. 154(b) by 0 days.

(21) Appl. No.: 09/582,449

(22) PCT Filed: Jan. 5, 1999

(86) PCT No.: PCT/EP99/00009

§ 371 Date: Jun. 26, 2000

§ 102(e) Date: Jun. 26, 2000

(87) PCT Pub. No.: WO99/35648

PCT Pub. Date: Jul. 15, 1999

(30) Foreign Application Priority Data

Jan. 8, 1998 (DE) ..................... 298 00 183 U

(51) Int. Cl.[7] .............................. B65D 85/57
(52) U.S. Cl. ................. 206/308.1; 206/310; 206/312
(58) Field of Search ............. 206/308.1, 310, 206/312

(56) References Cited

U.S. PATENT DOCUMENTS

| | | | |
|---|---|---|---|
| 4,499,994 A | * | 2/1985 | Rentch ................. 206/310 |
| 5,188,229 A | | 2/1993 | Bernstein |
| 5,402,882 A | * | 4/1995 | Bandy et al. ............ 206/310 |
| 5,518,488 A | * | 5/1996 | Schulger ................ 493/82 |
| 5,593,030 A | * | 1/1997 | Tell .................... 206/308.1 |
| 5,595,797 A | * | 1/1997 | Miller ................. 428/35.2 |
| 5,620,271 A | * | 4/1997 | Bergh et al. ............ 402/79 |
| 5,685,424 A | * | 11/1997 | Rozek et al. ........... 206/301.1 |
| 5,697,496 A | | 12/1997 | Bauer |
| 5,697,499 A | * | 12/1997 | Reiter ................ 206/308.1 |

FOREIGN PATENT DOCUMENTS

| | | |
|---|---|---|
| DE | 94 07 655 | 7/1994 |
| DE | 296 05 573 | 5/1996 |

* cited by examiner

*Primary Examiner*—Mickey Yu
*Assistant Examiner*—Troy Arnold
(74) *Attorney, Agent, or Firm*—Frishauf, Holtz, Goodman, Langer & Chick, P.C.

(57) ABSTRACT

A holder for at least one compact disk. The holder is made completely of an environmentally safe material and at the same time permits the compact disk to be fastened safely and with simple handling. The holder includes a case having at least one front side and a back side and at least one fastening element or fastening frame being disposed on an inside face of the case. The fastening element or fastening frame having dimensions which are adapted to accommodate a compact disk. The case and the fastening elements and/or fastening frames are made of a cardboard material.

5 Claims, 5 Drawing Sheets

HOLDING DEVICE FOR AT LEAST ONE COMPACT DISC

BACKGROUND OF THE INVENTION

1. Field of the Invention

The present invention relates to a holder for at least one compact disk (CD), which holder is provided with a case having a front side and a back side. On at least one of the inside faces of the case there are provided fastening means, with which the compact disk is fastened in the holder. Thus transportation and storage are made possible without the possibility of damage to the sensitive, information-carrying surface of the compact disk. The main use of compact disks comprises application as music CDs, although a compact disk is also used as an information medium, such as a CD-ROM.

2. Background of the Invention

Numerous forms of compact-disk holders comprising diverse materials are known in the prior art. For the most part, however, a transparent plastic case is used, wherein the fastening means comprises a substantially circular element with a plurality of tongues, on which the hole disposed centrally in each compact disk can be placed and snapped in. The individual tongues deform elastically during such placement action, so that the outside diameter of the upwardly protruding tongue ends is decreased and the compact disk can snap in. To remove the compact disk from this type of holder, the tongues are pressed down, so that the compact disk is released from the fastening means.

This type of fastening means, which is made exclusively of plastic, has become widely accepted. Therefore almost all compact-disk holders are provided with such a fastening means comprising tongues.

This plastic fastening means is also used in compact-disk holders whose case comprises a material other than plastic. For example, there are also known holders whose case comprises a cardboard material or metal. To fasten the compact disk, however, there is provided the aforesaid plastic tongue-containing fastening means, which is fastened in appropriate manner to one of the inside faces of the case, preferably by permanent adhesive.

There are also known compact-disk holders in which the case is provided with slip-in jackets, into which the compact disk is inserted from one side and which thereupon is surrounded almost completely by the material of the case.

The compact-disk holders known from the prior art and described hereinabove exhibit various disadvantages.

For example, some consumers, for reasons of environmental protection and also for aesthetic reasons, do not like to use plastics.

Furthermore, a compact-disk holder made entirely of plastic has the disadvantage that a paper liner or a corresponding adhesive label is usually additionally necessary on the inside of the case in order to convey information about the contents, since direct printing on the plastic material of the case is complex and expensive.

This drawback is partly countered in the prior art by the fact that the compact-disk holder is provided with a case comprising a cardboard material, which by its nature can be printed. In such a holder, however, the actual objective of fastening the compact disk is achieved only by the use of a retaining means comprising plastic. Consequently environmentally aware users are only partly satisfied.

In contrast, a package made completely of cardboard material is provided, for fastening the compact disk, merely with slip-in jackets, which largely surround the compact disk, so that fastening and release of the compact disk is difficult and complex. Not the least problem is that the sensitive surface of the compact disk then also suffers while it is being inserted into the case. In the last-mentioned holder, moreover, the surface of the compact disk is only partly discernible, even though it is used in itself besides the holder for conveying information about the contents of the compact disk.

The technical problem on which the invention is based is therefore to provide a holder for at least one compact disk, which holder is made completely from an environmentally safe material and at the same time permits the compact disk to be fastened safely and with simple handling.

SUMMARY OF THE INVENTION

The aforesaid technical problem is solved according to the invention by a holder for at least one compact disk. According to the invention, it has been recognized that the elasticity characteristics of the cardboard material can be utilized for safe fastening of the compact disk in the inventive holder. Furthermore, the invention is based on the knowledge that the dimensions of the compact disk are standardized, and so the inside diameter of the centrally disposed hole as well as the outside diameter of the compact disk are predetermined by a corresponding standard. Since, moreover, the cardboard material can be machined extremely accurately by appropriately preset punching presses, it is possible according to the invention to make fastening means which are matched both to the inside diameter of the compact disk and to the outside diameter of the compact disk. Accordingly, there are achieved the two inventive embodiments described herein below.

According to the holder for at least one compact disk according to a first embodiment of the present invention, at least one fastening element is fastened on one of the inside faces of the case, the case and the fastening element comprising a cardboard material. The fastening element has a substantially round structure, and is provided with an outside diameter matched to the inside diameter of the centrally disposed hole of the compact disk. Thus the compact disk can be placed over this fastening element, in the process of which the fastening element can elastically deform slightly, especially in the region of the outside diameter, by virtue of the elasticity of the cardboard material. There is achieved firm seating of the compact disk on the fastening element. The compact disk is therefore firmly held by the fastening element against the inside face of the case, to the effect that it cannot slip away from the fastening element without outside influence.

To remove the compact disk from the fastening element, the corresponding inside face of the case can be bent back away from the compact disk, so that the compact disk can be grasped from behind on its rim and pulled away from the fastening element. Likewise the fastening element present in the hole of the compact disk can be pushed out of this hole without bending the compact disk too severely in the process and thus damaging it. This is possible by virtue of the elasticity characteristics of the cardboard material, so that the case and also the fastening element elastically deform sufficiently under the exerted pressure and in turn the compact disk can be released safely from the fastening element and thus from the entire holder.

In the inventive practical example of a holder for at least one compact disk according to a second embodiment of the present invention, there is fastened on one of the inside faces of the case, instead of the fastening element described hereinabove, at least one fastening frame, both case and fastening frame comprising a cardboard material. The fastening frame is provided with a substantially circular opening, whose inside diameter is matched to the outside diameter of the compact disk. Thus the entire compact disk can be pressed into the circular opening provided by the fastening frame. Here also the elasticity characteristics of the cardboard material ensure that the fastening frame deforms elastically in the region of the inside edge of the opening and so safe joining and fastening are achieved when the compact disk is pressed in. To remove the compact disk, it is then also possible, by virtue of the elasticity characteristics of the cardboard material, to bend the inside face of the case back away from the compact disk, together with part of the fastening frame. The compact disk can then be grasped at least from one side, and so the compact disk can be pushed or pulled out of the fastening frame.

Both the fastening element and the fastening frame can be combined with one another in particularly preferred manner, so that the compact disk is held in the holder both at the outside diameter and at the inside diameter.

In a further preferred manner, at least one recess oriented radially outward is provided on the inside of the opening of the fastening frame, so that it is easier to grasp the edge of the compact disk from behind with a finger or hand during release of the compact disk from the fastening frame. Therewith removal of the compact disk is additionally simplified.

Finally, it is possible in a preferred manner to dispose one of the fastening means described hereinabove both on the inside face of the front side and on the inside face of the back side or of a further front side. Therewith a holder for two compact disks is then formed.

What is achieved on the whole in the inventive compact-disk holders is that, besides the uniformly used cardboard material and the environmental safe holder associated therewith, there can also be made an aesthetically suitable holder. By selection of different cardboard types and thicknesses, the external appearance can be advantageously influenced, as it can by a suitable form of printing.

BRIEF DESCRIPTION OF THE DRAWINGS

The invention will be explained in more detail hereinafter on the basis of practical examples with reference to the drawings, wherein.

DETAILED DESCRIPTION OF THE INVENTION

Figure 1:
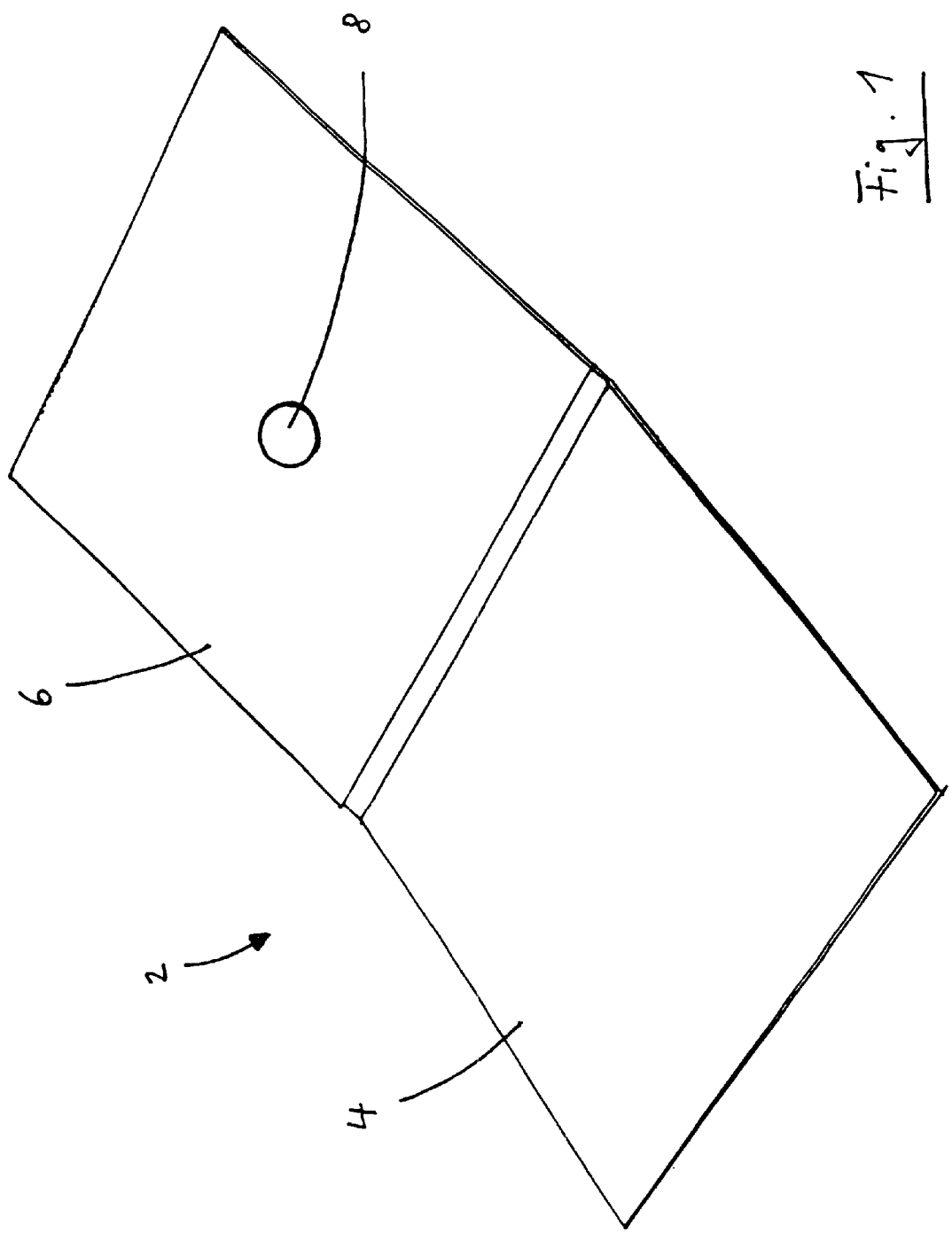
FIG. 1 shows a first inventive practical example of a compact-disk holder in a perspective view.

In FIG. 1 there is illustrated an inventive compact-disk holder, which is provided with a case 2 having a front side 4 and a back side 6. On one of the inside faces of case 2, namely on the inside face of back side 6, there is further disposed a fastening element 8. The position of this fastening element 8 relative to the total inside face of back side 6 is substantially central.

The practical example of the inventive holder illustrated in FIG. 1 is made completely of cardboard material, and so both case 2 and fastening element 8 comprise cardboard material.

Fastening element 8 has substantially round structure, the outside diameter of fastening element 8 being matched to the inside diameter of the centrally disposed hole of a compact disk, not illustrated. By placement of the compact disk on central fastening element 8 there is achieved reliable fastening of the compact disk on back side 6 of case 2, and so on the whole a reliable compact-disk holder is obtained.

Figure 2:
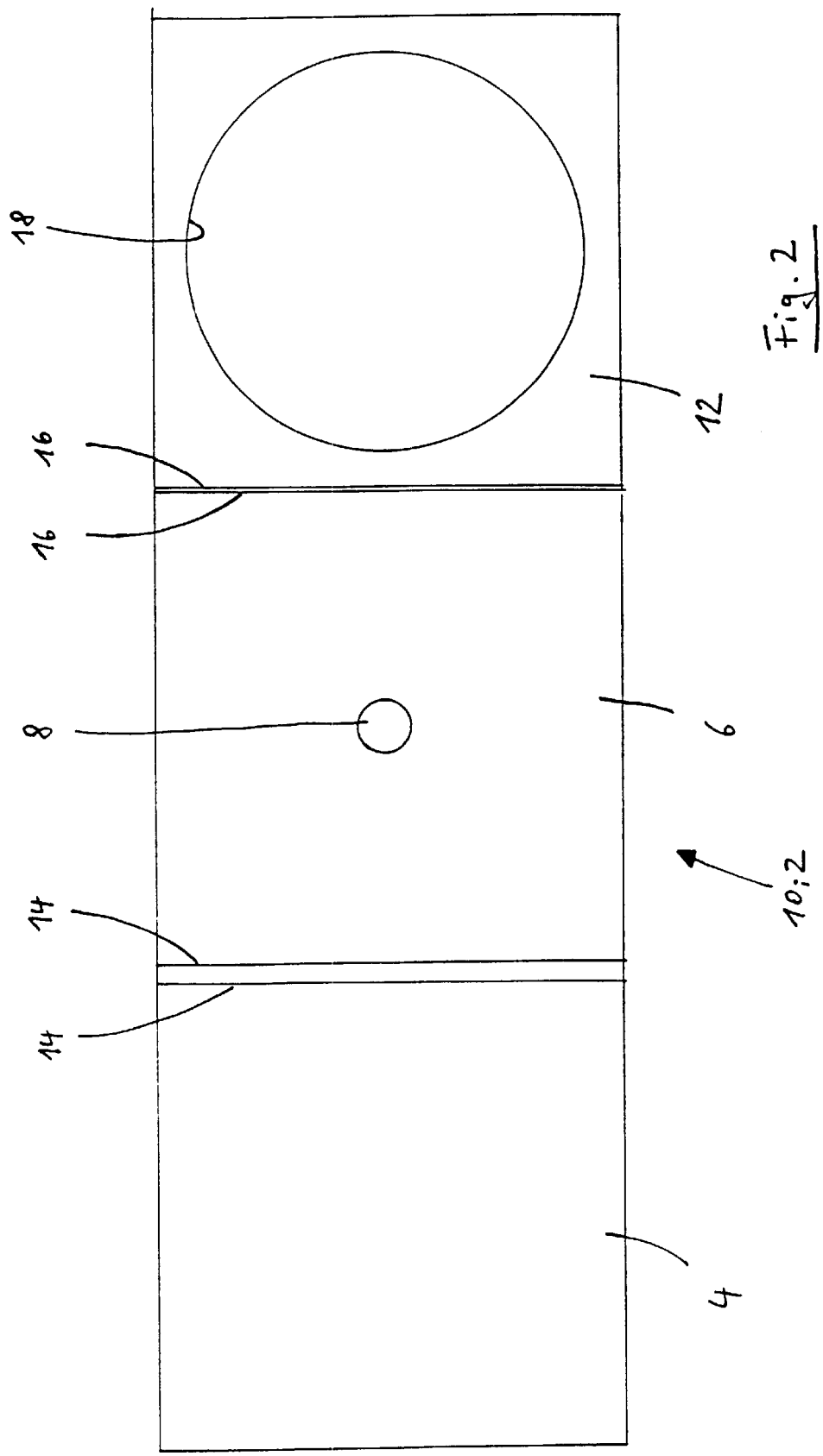
FIG. 2 shows the cut-to-size piece of cardboard material of a second inventive practical example of a compact-disk holder in a plan view.

In FIG. 2 there is illustrated the cut-to-size piece 10 of a second inventive practical example, which piece is made of cardboard material. Cut-to-size piece 10 has a rectangular elongate form on the whole, and is divided substantially into three square portions, which in the assembled condition form front side 4, back side 6 and a fastening frame 12. Between the different square portions there are provided creases 14 and 16, to ensure that bending along predetermined lines takes place when cut-to-size piece 10 is folded together. Creases 14 between front side 4 and back side 6 are spaced further from one another than are creases 16 between back side 6 and fastening frame 12. Therewith fastening frame 12 can be disposed between back side 6 and front side 4 once the folding together and adhesive bonding has been completed as described hereinafter, front side 4 simultaneously being oriented parallel to back side 6.

At substantially the center of back side 6 there is fastened a fastening element 8, preferably by adhesive. Fastening element 8 also comprises a cardboard material, preferably the same cardboard material as that of cut-to-size piece 10. Fastening element 8 has an outside diameter matched to the inside diameter of the hole disposed at the center of a compact disk, as already described hereinabove.

Fastening frame 12 has a circular opening 18 whose inside diameter is matched to the outside diameter of a compact disk. In this connection it is important that opening 18 of fastening frame 12 be disposed such that, in the assembled condition, opening 18 and fastening element 8 are disposed concentrically, so that not only does the centrally disposed hole of the compact disk fit over fastening element 8, but also opening 18 fits over the circumference of the compact disk.

Figure 3:
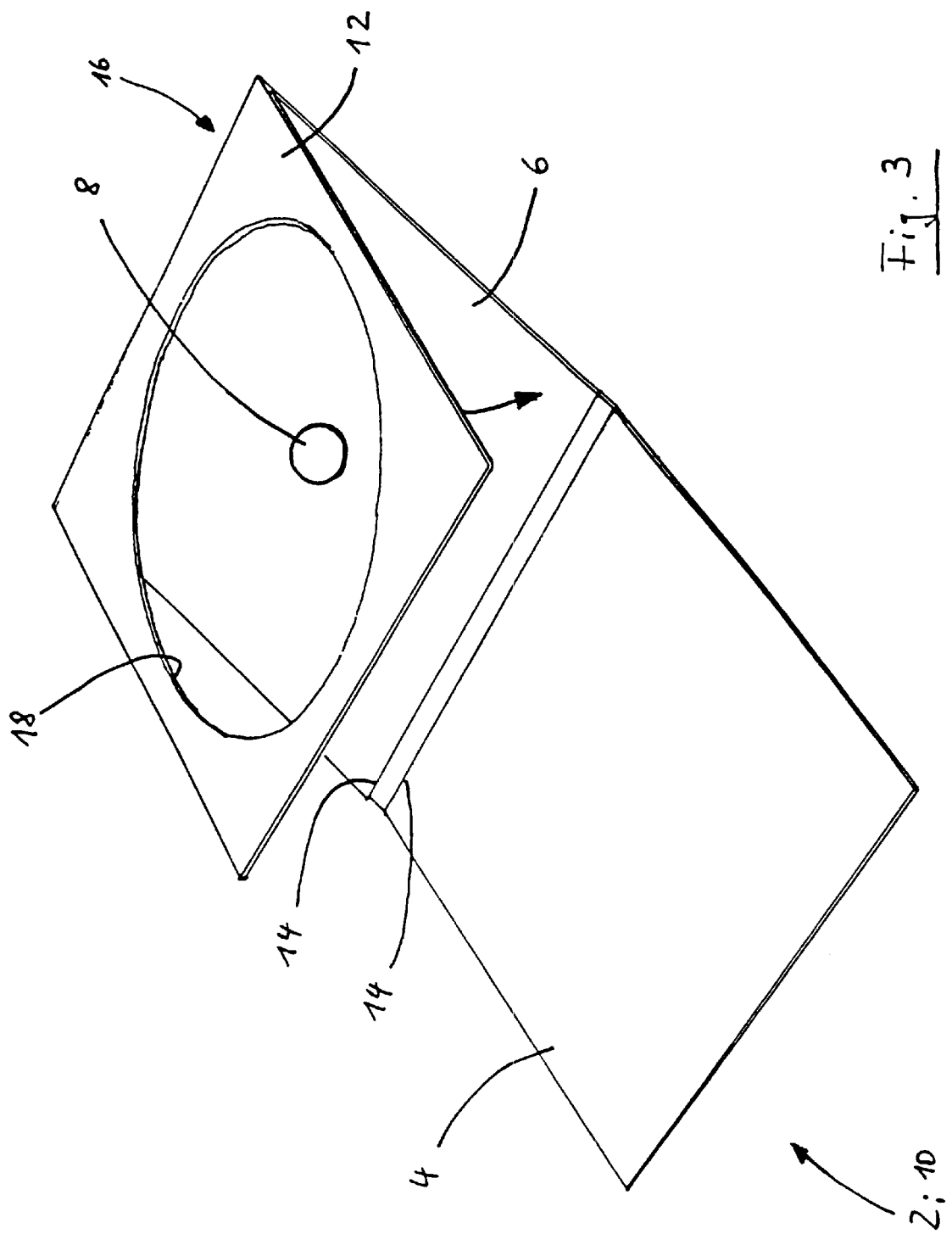
FIG. 3 shows the cut-to-size piece of cardboard material illustrated in FIG. 2 during manufacture of the holder in a perspective view.

FIG. 3 illustrates in a perspective view how cut-to-size piece 10 is folded together to form a compact-disk holder. Cut-to-size piece 10 is folded together along creases 14 and 16 in such a way that fastening frame 12 is brought into contact with the inside face of back side 6 and is adhesively bonded thereto. Therewith fastening frame 12 and back side 6 form a firm, stable unit. Front side 4 of case 2 can then be folded onto fastening frame 12, and locking means (not illustrated) such as adhesive strips, straps or snap fasteners can be provided. A compact disk can then be placed in opening 18 of fastening frame 12 and on fastening element 8 and pressed down. Thereby the compact disk becomes firmly seated inside the holder, although this firm seat can be released by bending cardboard fastening frame 12 together with back side 6.

FIGS. 4 to 7 illustrate how a holder for two compact disks is made.

Figure 4:
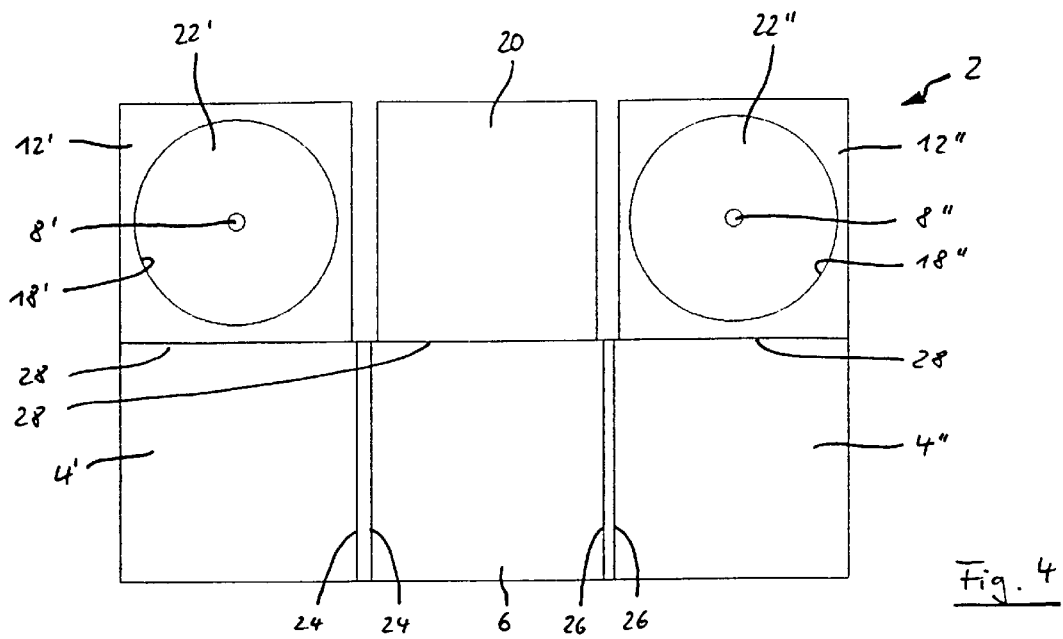
FIGS. 4–7 show the cut-to-size piece and the joining together of a holder for two compact disks.

FIG. 4 shows the corresponding cut-to-size piece of a case 2 with two front sides 4' and 4" as well as one back side 6. Joined thereto are fastening frames 12' and 12" as well as a reinforcing element 20. Inside fastening frames 12' and 12" there are disposed round pieces 22' and 22" as well as fastening elements 8' and 8". Round pieces 22' and 22"

correspond in their dimensions to a compact disk. The circumferential borders of round pieces 22' and 22" as well as of fastening elements 8' and 8" are punched substantially completely, in such a way that these pieces are held in fastening frames 12' and 12" but can be pushed out of those frames. Furthermore, creases 24, 26 and 28 are made in the cut-to-size piece, so that the cut-to-size piece can be folded together along predetermined lines to obtain a holder.

Figure 5:
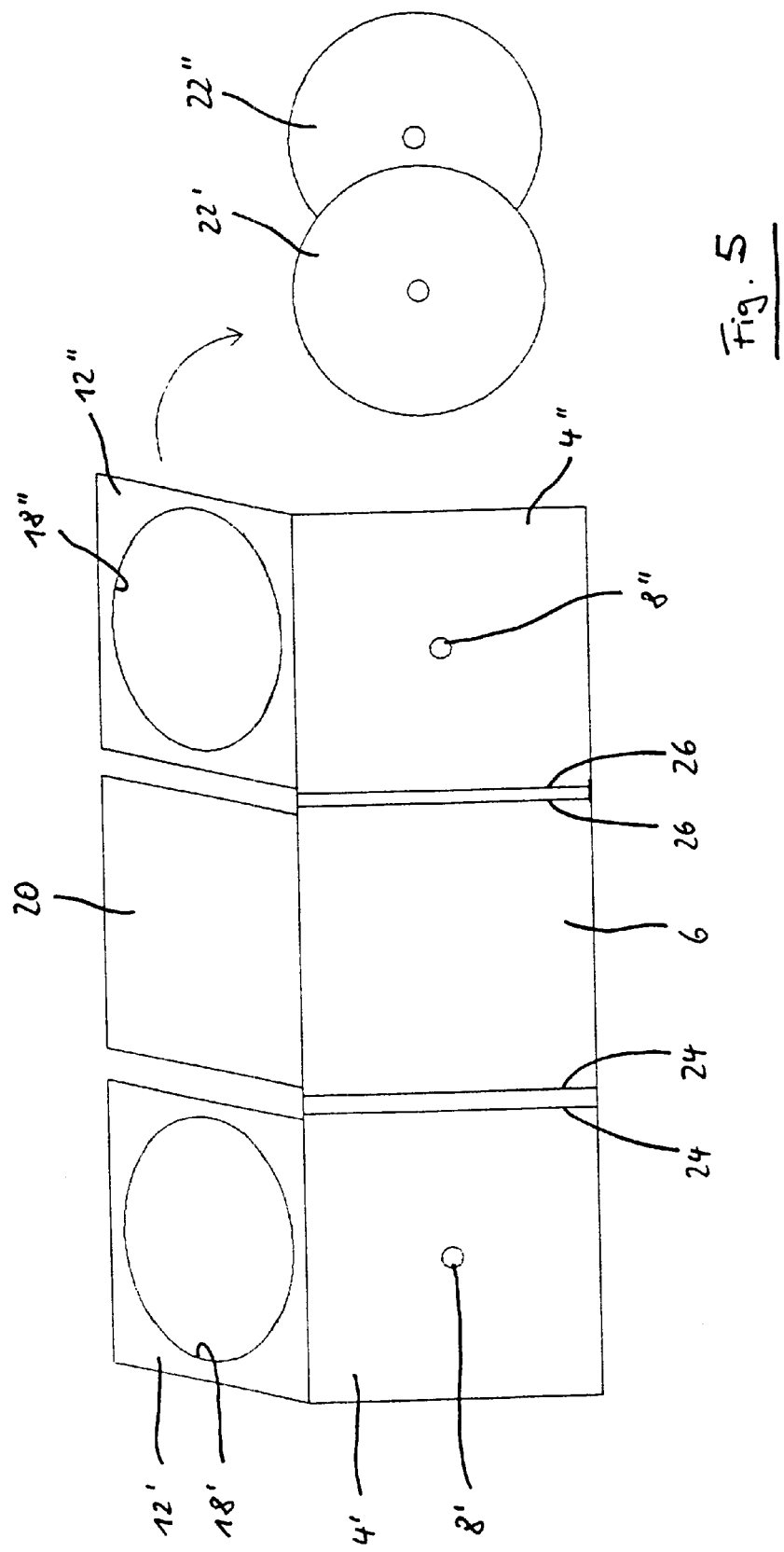

To begin the manufacturing process, fastening frames 12' and 12" are bent over and brought into contact with front sides 4' and 4". While under contact pressure in this way, fastening elements 8' and 8" are joined by adhesive to front sides 4' and 4". Fastening elements 8' and 8" are separated from round pieces 22' and 22" by pressing them out of those round pieces. Then fastening frames 12' and 12" together with round pieces 22' and 22" are bent back up again and round pieces 22' and 22" are released from fastening frames 12' and 12". This is illustrated in FIG. 5.

Figure 6:
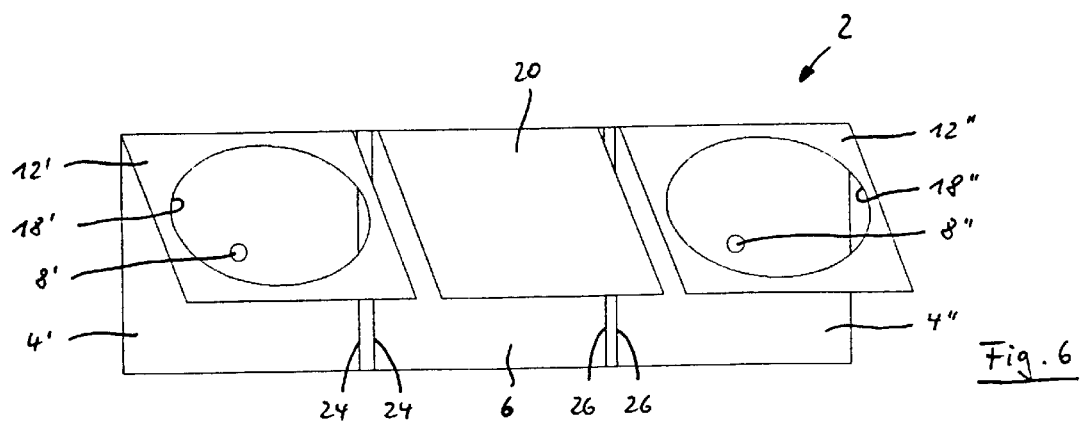
Figure 7:
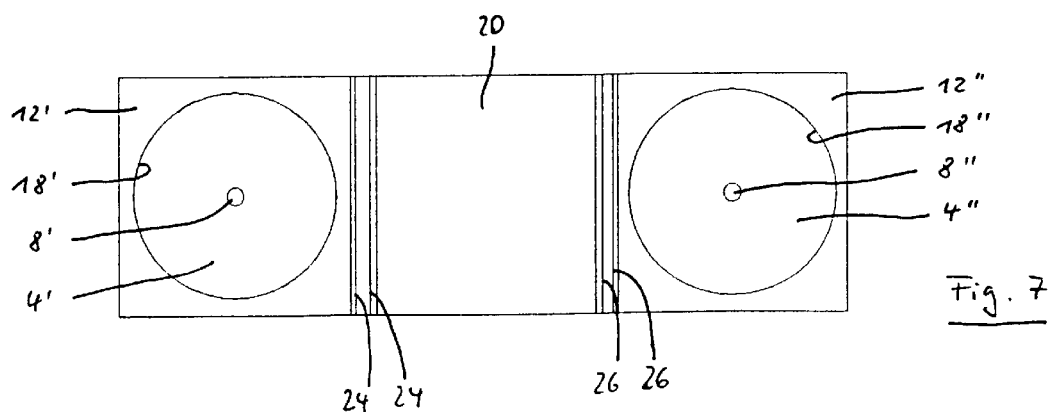

FIG. 6 shows how fastening frames 12' and 12" are bent over once again, as is reinforcing element 20, in order to bring them into contact with front sides 4' and 4" as well as back side 6. They are then joined to one another by adhesive, thus producing the finished holder for two compact disks illustrated in FIG. 7. The remaining step is then merely to bend it over along creases 24 and 26.

The configuration of the cut-to-size piece with round pieces 22' and 22" illustrated in FIG. 4 makes it possible in simple manner to join fastening elements 8' and 8" to front sides 4' and 4" at centered position. Once fastening frames 12' and 12" have been fastened, these fastening elements are oriented in exactly centered relationships on openings 18' and 18", so that a compact disk simultaneously fits over each fastening element 8' and 8" as well as in each fastening frame 12' and 12".

Released round pieces 22' and 22" can be printed, and so they can be additionally used advantageously as advertising material.

List of Reference Symbols 2 case
4 front side
6 back side
8 fastening element
10 cut-to-size piece
12 fastening frame
14 crease
16 crease
18 opening
20 reinforcing element
22 round piece
24 crease
26 crease
28 crease

What is claimed is:

1. A holder for at least one compact disk having a centrally disposed hole, the holder comprising a case made of a cardboard material, the case having at least one front side and a back side and at least one fastening element punched out of the same cardboard material as the case and being disposed on an inside face of the case, the fastening element further having a substantially round and flat structure with the outside diameter thereof being matched to the inside diameter of the centrally disposed hole of the compact disk.

2. The holder according to claim 1, further comprising at least one fastening frame made of a cardboard material which is disposed on an inside face of the case, the fastening frame being provided with a substantially circular opening, the inside diameter of the substantially circular opening being matched to the outside diameter of the compact disk and the substantially circular opening being disposed centrally on the fastening element.

3. The holder according to claim 1, wherein at least one of (i) a plurality of fastening elements and (ii) a plurality of fastening frames are disposed on an inside face of the front side of the case and on an inside face of the back side of the case or of a further front side of the case.

4. The holder according to claim 2, wherein at least one of (i) a plurality of fastening elements and (ii) a plurality of fastening frames are disposed on an inside face of the front side of the case and on an inside face of the back side of the case or of a further front side of the case.

5. The holder according to claim 3, wherein at least one of (i) a plurality of fastening elements and (ii) a plurality of fastening frames are disposed on an inside face of the front side of the case and on an inside face of the back side of the case or of a further front side of the case.

* * * * *